United States Patent
Parker

(10) Patent No.: US 6,178,427 B1
(45) Date of Patent: Jan. 23, 2001

(54) METHOD OF MIRRORING LOG DATASETS USING BOTH LOG FILE DATA AND LIVE LOG DATA INCLUDING GAPS BETWEEN THE TWO DATA LOGS

(75) Inventor: Christopher F. Parker, Oswego, IL (US)

(73) Assignee: Platinum Technology IP, Inc., Oakbrook Terrace, IL (US)

(*) Notice: Under 35 U.S.C. 154(b), the term of this patent shall be extended for 0 days.

(21) Appl. No.: 09/074,080

(22) Filed: May 7, 1998

(51) Int. Cl.[7] .................................................... G06F 12/00
(52) U.S. Cl. .......................... 707/202; 707/203; 707/204
(58) Field of Search ................................... 707/202, 204, 707/203

(56) References Cited

U.S. PATENT DOCUMENTS

| | | | |
|---|---|---|---|
| 5,544,359 | * 8/1996 | Tada et al. | 395/600 |
| 5,613,106 | * 3/1997 | Thurman et al. | 395/620 |
| 5,668,986 | * 9/1997 | Nilsen et al. | 395/610 |
| 5,742,792 | * 4/1998 | Yanai et al. | 395/489 |
| 5,799,141 | * 8/1998 | Galipeau et al. | 395/182 |
| 5,901,327 | * 5/1999 | Ofek | 395/825 |
| 5,903,898 | * 11/1999 | Cohen et al. | 707/204 |
| 6,044,444 | * 3/2000 | Ofek | 711/162 |

* cited by examiner

Primary Examiner—Thomas G. Black
Assistant Examiner—Thuy Do
(74) Attorney, Agent, or Firm—Baker & McKenzie

(57) ABSTRACT

A method of mirroring log data in real time. The method can be used to mirror all log data from a source database or only that log data pertaining to a subset of objects in the source database. The log data is written to one or more datasets which are created and stored in a target database system which is typically remotely located. The log datasets in the target system can be used for disaster recovery of the source system. The method monitors log data from the source system and automatically updates target log datasets accordingly.

6 Claims, 5 Drawing Sheets

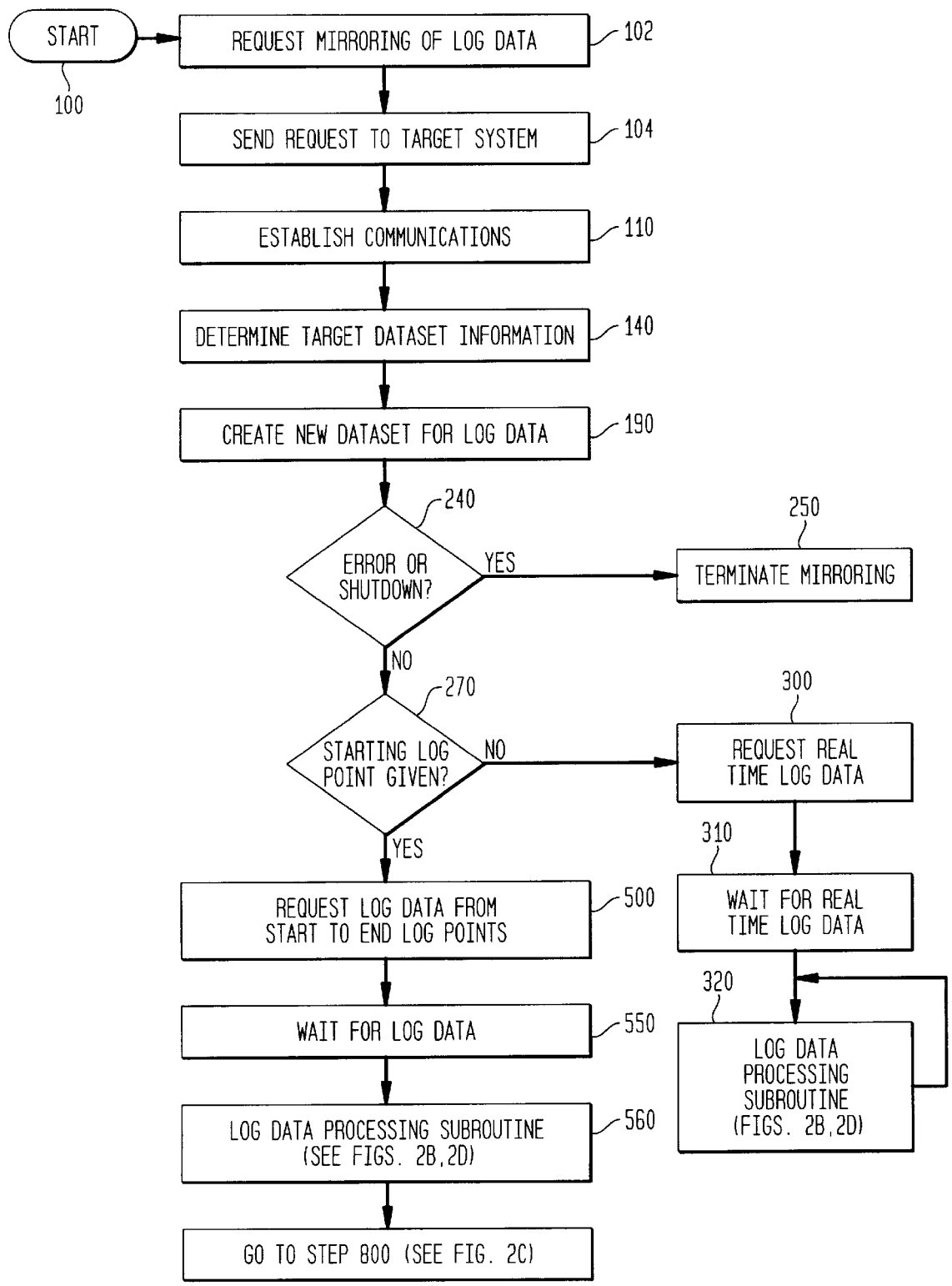

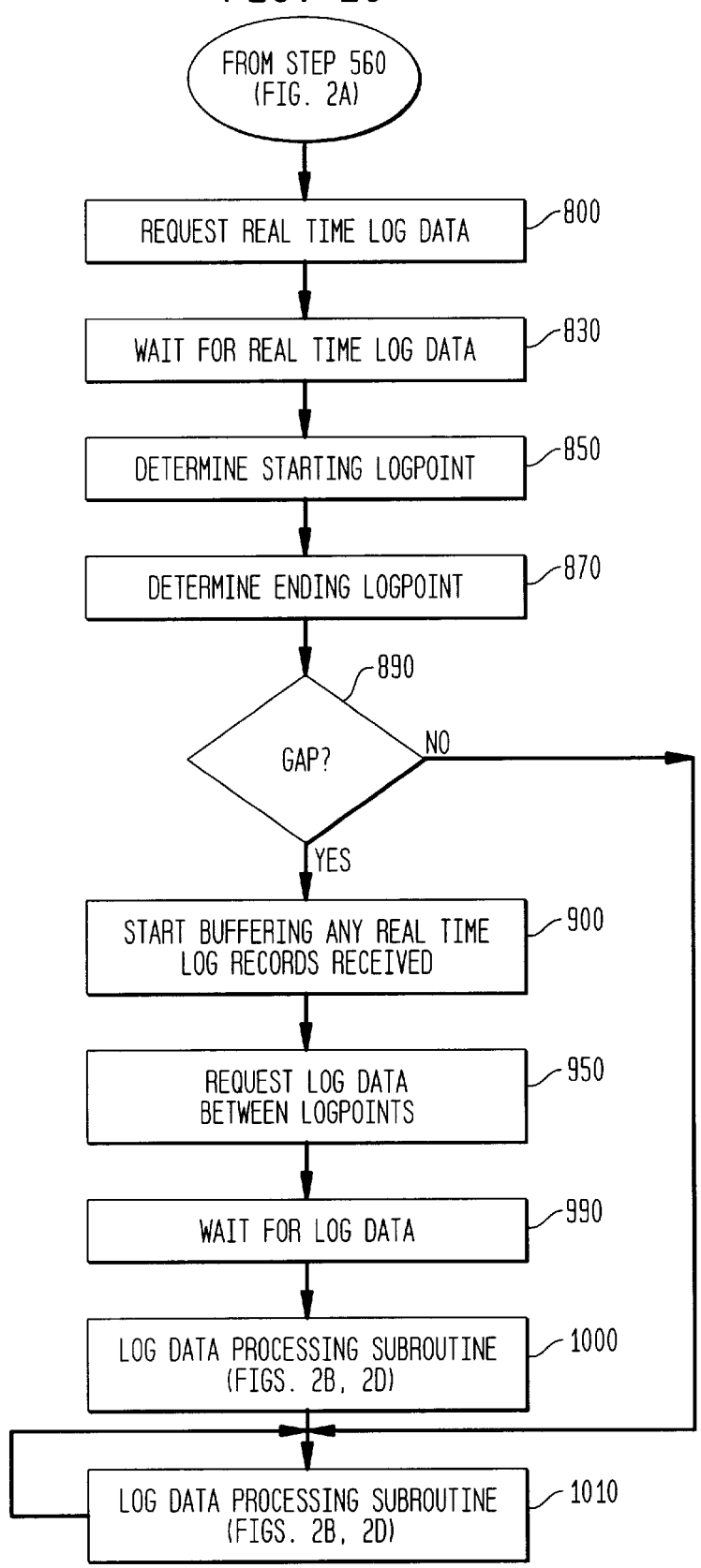

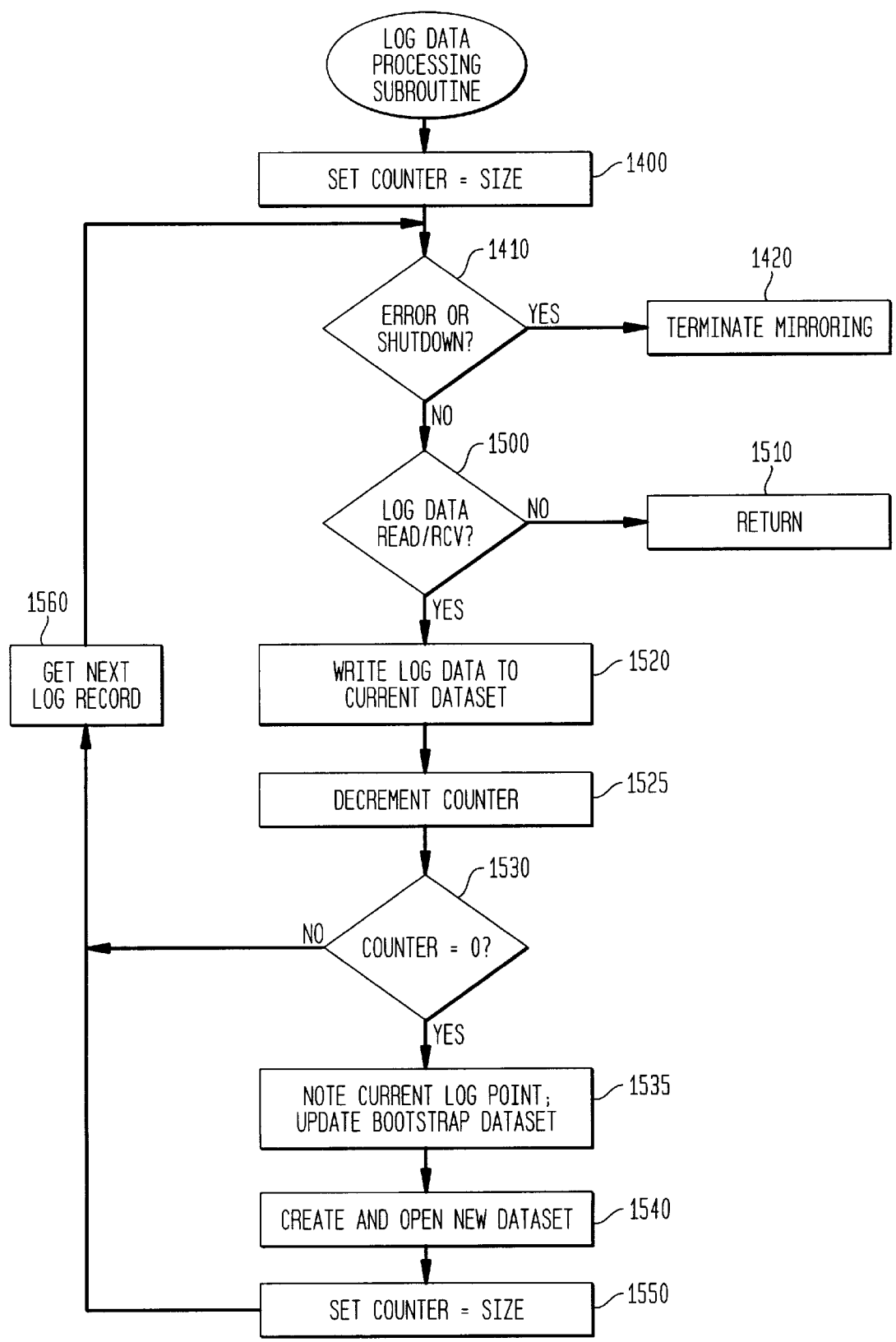

METHOD OF MIRRORING LOG DATASETS USING BOTH LOG FILE DATA AND LIVE LOG DATA INCLUDING GAPS BETWEEN THE TWO DATA LOGS

FIELD OF THE INVENTION

The present invention relates to database management systems, in particular to systems and methods of mirroring database log data.

BACKGROUND OF THE INVENTION

Methods and systems are known for creating and maintaining backup copies of a primary database which can be used in place of the primary database should the primary database become unavailable. The backup and primary databases are typically maintained on separate systems at remote locations, to reduce the possibility that a disruptive event will affect both databases. Changes made to the primary database are typically logged and then applied to the backup database to keep the backup database up-to-date with the primary database. Furthermore, the logged changes can also be re-applied to the primary database to recover from a disaster affecting the primary database. Like the backup system, the change logs are typically shipped to and kept at a location remote from the primary system.

Important considerations in disaster recovery planning with regard to any database management system (DBMS) such as DB2 (from International Business Machines of Armonk, New York) in which log records are used to rebuild the system, are how to get the log records offsite to a remote location and how often. Currently, a typical solution is to create copies of the log datasets and ship them to the remote site on some type of regular schedule, e.g., once a day. However, if a disaster should occur at the primary site hours after the logs are created and shipped offsite, a large amount of data may be lost, requiring re-entry of many transactions into the primary system.

In the case of recovering individual database objects, such as a DB2 tablespace, a major source of delay in the recovery process is the reading of the DB2 log. The log not only contains information for the tablespace being recovered, it also contains log information for the entire system including other objects which are not of interest. As a result, a large amount of unneeded data may be read in order to perform the recovery of a single tablespace.

Existing products such as R+/CHANGE ACCUM from BMC Software, Inc. of Houston, Tex. and MERGE/MODIFY from Platinum Technology, Inc. of Oakbrook Terrace, Ill., offer a mechanism to extract log data from the DB2 log to create proprietary datasets containing only the pertinent log data for one or more selected tablespaces. This can help eliminate unnecessary I/O operations. Nonetheless, these processes still need to be scheduled. This may still require that unneeded log datasets be read to catch any updates that were made since the last time the proprietary datasets were created.

SUMMARY OF THE INVENTION

The present invention provides a method and system for creating and maintaining mirror log datasets in real time.

The present invention also provides a method of automatically performing gap recovery and a mechanism to create, in real time, standardized (e.g. DB2 compliant) log datasets or proprietary log datasets which contain log data pertaining to one or more selected objects, such as tablespaces. The selected objects for which log mirroring is performed can be in the same source database or in different source databases.

In accordance with an embodiment of the present invention, a mirroring transaction processing task is started on each of a local and a remote site. A user request to initiate mirroring of log datasets is sent to the remote task. In response, the remote task obtains information from the local DBMS to determine the size of the new log datasets which are to mirror the original log datasets and allocates the new datasets accordingly. The remote task then requests both archived and active log data from the local DBMS. Upon receiving the requested log data, the remote task passes the log data to a formatting routine in which the raw log data is written, for example, to a new DB2 log dataset or to a proprietary dataset. If there is a gap in the log data, then gap recovery is performed. If there is an error in writing log data to the dataset, the remote task determines whether a new dataset is needed, and if so, defines the new dataset and rewrites the log data into the new dataset.

BRIEF DESCRIPTION OF THE DRAWINGS

FIGS. 2A, 2B, 2C and 2D are flow diagrams of a log mirroring process in accordance with the present invention.

DETAILED DESCRIPTION OF THE INVENTION

Figure 1A:
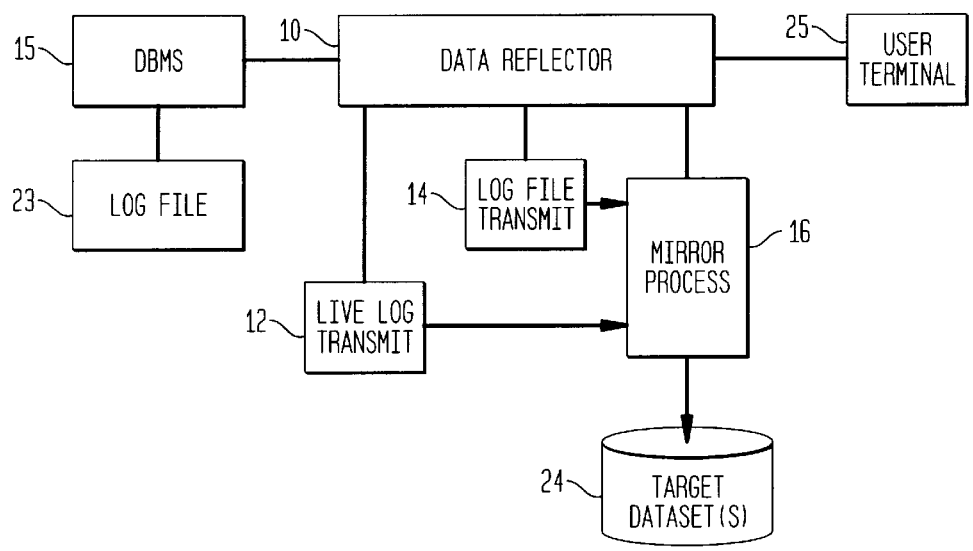
FIGS. 1A and 1B are functional block diagrams of embodiments of local and remote log mirroring systems in accordance with the present invention.

FIG. 1A is a block diagram of a local, real-time, log mirroring system in accordance with the present invention. In the system of FIG. 1A, a database management system (DBMS) 15, such as DB2, maintains a source log file 23. Actions performed on a primary database (not shown) are logged by the DBMS 15 in the log file 23 which is typically stored in mass storage (e.g., tape, disk). The DBMS may also maintain a live, or real time log of the most recent logged actions which is typically maintained in faster, volatile memory (e.g. RAM). The DBMS 15 provides the log data in the log file and the live log data to a data reflector process 10. The DBMS 15 may manage more than one database, in which case, it provides log data for each database.

The data reflector process 10, which runs on a database computer system, e.g., an MVS system, serves as a transaction processor for mirroring data. The data reflector process 10 and the DBMS 15 typically run on the same hardware platform. The data reflector process 10 interacts with processes 12–16 running on the database computer system. A mirror process 16 manages the mirroring functions in accordance with the present invention by interacting with a live log transmit process 12 and a log file transmit process 14.

Log entries written into the log file are sent by the log file transmit process 14 to the mirror process 16. Once the log file has been transmitted by the process 14, real time logged actions in the live log are sent to the mirror process 16 by the live log transmit process 12 as those actions occur.

The mirror process 16 takes the log entries received from the live log transmit process 12 and the log file transmit process 14 and writes them into a standard format (e.g., DB2 compliant) target log dataset 24 or one or more specialized or "proprietary" target log datasets 24, with each proprietary dataset 24 being written with log data pertaining to one or more selected database objects.

A terminal 25 which interfaces to the data reflector process 10 can be used to provide a user interface with the mirroring process. The terminal 25 can be used to request the mirroring of log data, to input processing options or to monitor the mirroring process.

Figure 1B:
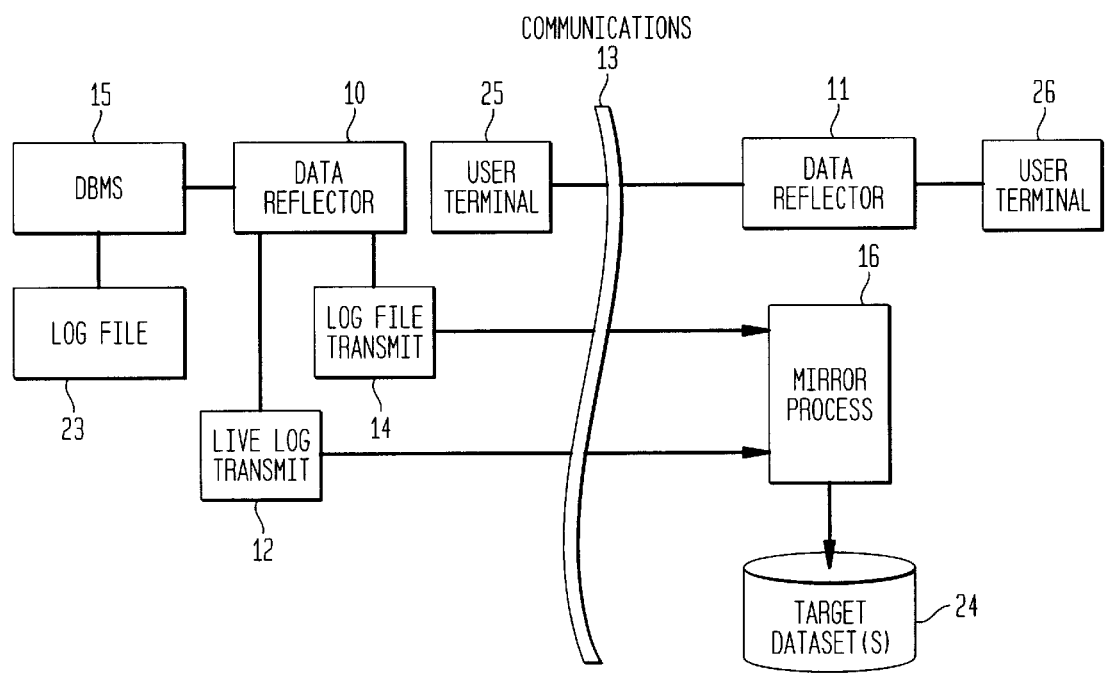

FIG. 1B is a block diagram of a remote, real-time log mirroring system in accordance with the present invention. The components and functionality of the system of FIG. 1B are similar to those of the local mirroring system of FIG. 1A except that the target and source systems are remotely located and are linked by a communications system 13, such as an intranet, LAN, WAN, etc. In this embodiment, data reflector processes 10 and 11 run on each of the source and target systems, respectively. The log file transmit process 14 and the live log transmit process 12 reside on the source system and operate as in the local mirroring system of FIG. 1A to transmit log data to a log mirror process 16, which resides on the target system and operates in the same manner as in FIG. 1A.

Furthermore, a user terminal 25, typically co-located with the source system, is used to provide user input to the data reflector process 11 in the target system and to allow monitoring of the mirroring process. Another user terminal 26 can also be located at the target system and serves the same purpose as terminal 25.

The method and system of the present invention will now be described in greater detail with reference to FIGS. 2A through 2D. FIGS. 2A–2D are flow charts illustrating an exemplary embodiment of a log mirroring process in accordance with the present invention. The method and system of the present invention can be used for local or remote log mirroring. Furthermore, although the exemplary embodiment of FIGS. 2A–2D is adapted to operate with the DB2 DBMS, other embodiments of the present invention for operation with other kinds of DBMSs can also be implemented.

As shown in FIG. 2A, in step 100, a data reflector task is started on each of the source and target systems, in the case of remote mirroring (see FIG. 1B). As described above, in the case of local mirroring (see FIG. 1A), because there is only one system involved, only one data reflector task is started, although the essential operational steps will be similar.

Once a data reflector task has started on each system, log data mirroring can begin, typically in response to a user request from the source system, as indicated by step 102. The user may optionally specify a starting log point for the log data, to be mirrored. This request is sent, in step 104, from the user terminal 25 at the source system to the target system, which, in response, initiates a sub-process beginning with step 110.

Mirroring can also be initiated in response to a request from an application running on the source system. The request to perform log mirroring will specify whether the log mirroring process will include all log data or only the log data pertaining to selected database objects specified in the request.

In step 110, the data reflector process on the target system opens a link to the resident communications facilities to establish communications between the source and target systems. Once a communications link has been established between the source and target systems, the target system, at step 140, obtains certain information from the source system which is used in setting up log datasets in the target.

Where log mirroring is to be performed for selected objects, the target system extracts information from the DB2 catalog in the DBMS 15 which pertains to the selected objects. The DB2 catalog, which is a part of the DB2 system, provides information on all DB2 objects in the system. More specifically, internal identifiers of the objects for which a log dataset is to be created in the target system are obtained by the target system from the DB2 catalog. Each record of log data which is to be received from the source system will include the internal object identifier of the object to which that log record pertains. Using the identifiers, the target system determines a size for the target log dataset into which the log data is to be written.

In the case where all log data is to be mirrored, the target system obtains information from a bootstrap dataset in the DB2 DBMS 15. The bootstrap dataset contains, among other things, information regarding all of the log datasets in the DBMS 15.

Using this information, the target system determines the size of the largest log dataset in the source system and then determines the size of the target log dataset to be created based upon the size of the largest log dataset in the source system. As will be described more fully below, the method of the present invention maintains in the target system another bootstrap dataset which can be used to perform database recovery in the target system.

As an alternative to extracting information from the DB2 catalog or bootstrap dataset to determine the allocation of space for the target log dataset, the user can specify the target log dataset size (e.g., in step 102).

Using the information extracted in step 140 and/or the user information provided in step 102, a new dataset for log data is created in step 190. In the case where all log data is to be mirrored, one log dataset is created. Likewise, in the case where log data for selected objects is to be mirrored, one log dataset is created for the log data pertaining to the selected objects. The log entries optionally may be sorted by object so as to create separate blocks of log entries, one block for each object, within the same log dataset. Using the user input and appending the information extracted in step 140, a target dataset name is thereby generated.

It should be noted that multiple instances of the process of the present invention can be executed in parallel to handle the creation and updating of multiple target log datasets at the same time. For example, the user, in step 102, may request log mirroring for three objects, with one target dataset mirroring log data for two of the objects and a second target dataset mirroring log data for the third object. In this case, two threads of the process of the present invention would be initiated and executed, one thread for each of the two target log datasets.

Once a target log dataset has been created in step 190, operation then proceeds to step 240 in which it is determined if there is a pending error condition (such as a communications failure) or whether the user has requested a shutdown of the mirroring process. If there is an error condition or a shutdown has been requested, operation of the mirroring process terminates, as indicated in step 250, otherwise, operation proceeds to step 270 in which it is determined whether the user has specified (in step 102) a starting log point (in the log file) for the log data to be mirrored. If the user has not specified a starting log point, then operation branches to step 300 in which the target system requests real time log data from the source system. Real time log data is log data that has not yet been entered into the log file and includes the most recent log data that was generated subsequent to the log data in the log file. Once the target system requests the real time log data, there will typically be a delay until the target system actually begins receiving the requested log data. This delay is represented by step 310. Once reception of the real time log data begins, operation proceeds to step 320 in which a log data processing subroutine is called. Two embodiments of this subroutine are described below with reference to FIGS. 2B and 2D.

If it is determined in step 270 that the user has specified a starting log point, operation proceeds to step 500. In step 500, the target system requests from the source system log data from the log file. More specifically, the target system requests those entries in the log file from the starting log point up to an ending log point. The ending log point is the most current log file entry, and can be determined, for instance, from an end-of-file indication in the log file. Once the target system requests the log data, there may be a delay until the target system actually begins receiving the requested log data. This delay is represented by step 550. Once reception of the log data begins, operation proceeds to step 560 in which a log data processing subroutine is called. A flow chart of this subroutine is shown in FIG. 2B.

Figure 2B:
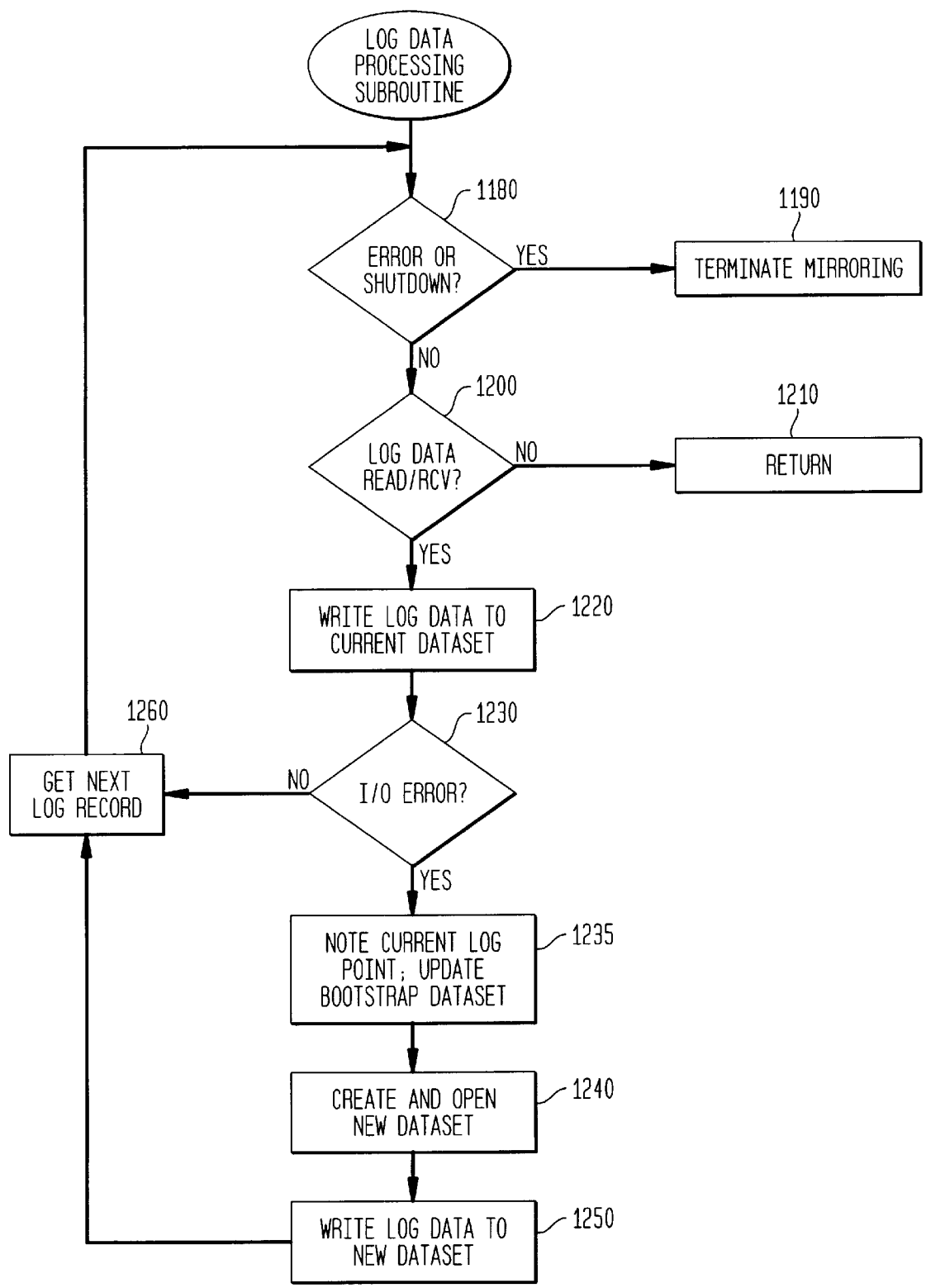

As shown in FIG. 2B, when the log data processing subroutine is called, operation proceeds to step 1180 in which it is determined if there is a pending error condition (such as a communications failure) or whether the user has requested a shutdown of the log mirroring process. If there is an error condition or a shutdown has been requested, operation of the log mirroring process terminates, as indicated in step 1190, otherwise, operation continues to step 1200 in which a determination is made as to whether there is log data to be processed; e.g., whether the target system has received a log data record that has yet to be written to a target dataset. If there is log data to be processed, operation proceeds to step 1220 in which the current record of log data is written to the current log dataset in the target system. If the log dataset is full, while attempting to write the log data record to the dataset, an I/O error will occur. If it is determined in step 1230 that no I/O error has occurred, operation branches to step 1260, in which the next log record is obtained.

If an I/O error is detected in step 1230, operation proceeds to step 1235 in which the current log point is noted and the bootstrap dataset in the target system is updated accordingly. For purposes of recovering the source database (or selected objects thereof) on the target system, the bootstrap dataset in the target system contains, among other things, a table of target log dataset identifiers with the associated range of log records that are mirrored by each target log dataset. Thereby, when recovery is to be performed at the target system, one can read the bootstrap dataset and identify the target log dataset in which each log record is written. Therefore, in step 1235, the target bootstrap dataset is updated by saving therein the first and last log points of the just-filled target log dataset.

Operation then proceeds to step 1240 in which a new dataset is created and opened. The current log data record is then written to the new dataset in step 1250. The next log record is then obtained in step 1260 and operation loops back to step 1180. If in step 1200 it is determined that there are no more log records to process, e.g., that the reception of log data has ceased, operation returns (step 1210) to the point from which the log data processing subroutine of FIG. 2B was called.

With reference once again to FIG. 2A, once operation returns from the log data processing subroutine of FIG. 2B, i.e., once all of the log data requested in step 500 has been received and processed in the log data processing subroutine of FIG. 2B and there is no more log data in the log file to be received, operation proceeds to a live log and gap processing procedure commencing with step 800 and depicted in FIG. 2C.

In step 800, the target system requests the real time log data from the source system. Once the target system requests the real time log data, there may be a delay until the target system actually begins receiving the requested log data, as represented by step 830. Once reception of the real time log data begins, operation proceeds to step 850 in which the starting log point of the real time log data is determined from the first record of the real time log data received. Operation continues to step 870 in which the ending log point of the log data read from the log file is determined.

If there is a gap between the aforementioned ending and starting log points, this indicates that log entries were made into the log file after the target system completed its processing of the log file (in the log data processing subroutine invoked in step 560) but before the target system received the first record of real time log data in step 850.

Once the aforementioned ending and starting log points have been determined, operation proceeds to step 890 in which a determination is made as to whether there is a gap between the ending and starting log points. If there is no gap, operation proceeds to step 1010 in which the log data processing subroutine of FIG. 2B is invoked in order to process the real time log data being received.

If it is determined in step 890, however, that there is; a gap, the log records in the gap must be received from the log file and processed. However, while these gap log records are being received and processed, the target system may also receive further real time log records. As shown in FIGS. 1A and 1B, there are separate communications channels for the real time and file log data so that the target system can receive both types of log records at the same time. As such, before the target system proceeds with the processing of gap log records from the log file, buffering of any real time log records received during the processing of the gap log records is initiated in step 900. The first real time record placed in the buffer is the log record received in step 850, discussed above. As will be described below, once the gap log records have all been received from the log file and processed, the method of the present invention processes the buffered real time log records.

Operation proceeds to step 950 in which the target system requests the so-called gap log data in the log file between the ending and starting log points so as to obtain any updates to the primary database that may have been entered into the log file after the target system completed its processing of the log file data (step 560) but before the first record of real time log data received in step 850. As before, once the target system requests the log data, there may be a delay until the target system actually begins receiving the requested log data. This delay is represented in step 990. Once reception of the log data begins, operation proceeds to step 1000 in which the log data processing subroutine of FIG. 2B is invoked in order to process the gap log data.

Once all of the gap log data requested in step 950 has been received and processed in the subroutine of FIG. 2B (step 1000) and there is no more gap log data to be received, operation returns from the subroutine to step 1010 in which the subroutine of FIG. 2B is invoked again in order to process the real time log data. In this invocation of the log data processing subroutine of FIG. 2B, it is determined in step 1200 whether there is any real time log data to be processed, i.e., whether there is any real time log data currently being received by the target system or whether there are any buffered-up real time log records to be read. If it is determined in step 1200 that there are real time log records to be processed, operation proceeds as described above. If all real time log data has been processed, i.e., there is no more real time log data to read or receive (the answer to step 1200 is "No"), operation returns, in step 1210, to the point from which the subroutine was called. In this case, operation returns to step 1010 (FIG. 2C).

At this point, the log datasets in the target system are up to date. As shown in FIG. 2C, the real time log is constantly monitored by the repeated calling, in step 1010, of the log processing subroutine. The process of the present invention thereby maintains the target log datasets up to date.

As described above, when writing log data to a target dataset in the subroutine of FIG. 2B, the method of the present invention determines that the dataset is full if an I/O error is generated (step 1230). FIG. 2D depicts an alternative embodiment of a procedure for processing log data which avoids I/O errors. As discussed above in connection with step 140 (FIG. 2A), a size for the target log datasets is determined. In step 1400, a counter is set to the number of records to be contained in each target log dataset. Operation then proceeds to step 1410 in which it is determined if there is a pending error condition (such as a communications failure) or whether the user has requested a shutdown of the log mirroring process. If there is an error condition or a shutdown has been requested, the log mirroring process terminates, as indicated in step 1420, otherwise, operation continues to step 1500.

In step 1500, a determination is made as to whether there are any log data records to be processed; i.e., whether the reception of log data is in progress or whether there are buffered real time log data records to be processed. If so, operation proceeds to step 1520 in which the current log data record is written to the current dataset. Operation then proceeds to step 1525 in which the counter is decremented to indicate that there is room for one less record in the current dataset.

At step 1530, a determination is made as to whether the counter has been decremented to zero. If the counter is not yet zero, operation proceeds to step 1560 in which another log data record is obtained. Operation then loops back to step 1410 and proceeds as before.

If it is determined in step 1530 that the counter has been decremented to zero, then there is no more room in the current dataset and operation proceeds to step 1535 in which the current log point is noted and the bootstrap dataset in the DBMS 15 is updated accordingly, as described above in connection with step 1235 (FIG. 2B). Operation then continues to step 1540 in which a new dataset is created and opened. The counter is reset to the size of the dataset, in step 1550, and operation proceeds to step 1560 to obtain the next log data record.

If it is determined in step 1500 that there are no more log data records to process, i.e., the reception of log data has stopped or there are no more buffered real time log data records, operation returns (step 1510) to the point from which the subroutine of FIG. 2D was invoked.

What is claimed is:

1. A method of mirroring log data for a database wherein the log data includes live log data and log file data contained in a log file, comprising the steps of:

receiving log file data between a starting log point and an ending log point;

writing the log file data into a dataset;

receiving live log data;

determining if there is a gap between the live log data and the log file data;

performing a gap recovery if there is a gap, the gap recovery including receiving gap log file data and writing the gap log file data into the dataset; and writing the live log data into the dataset.

2. The method of claim 1, wherein the steps of writing log data into the dataset include determining whether the dataset is full and if the dataset is full, writing the log data into a new dataset.

3. The method of claim 2, wherein determining whether the dataset is full includes detecting an I/O error.

4. The method of claim 2, wherein determining whether the dataset is full includes counting a number of log records written into the dataset.

5. A method of mirroring log data for a database, comprising:

applying log file data between a starting log point and an ending log point into a dataset;

receiving live log data continuously;

determining whether log data gap exists between the live log data and the log file data;

buffering data in the live log data if the log data gap exists;

applying gap log file data into the dataset if the log data gap exists; and applying the buffered data into the dataset.

6. A method of mirroring log data for a database as claimed in claim 5, further including:

applying the live log data.

* * * * *